(No Model.)

P. W. RECK.
CHUCK.

No. 504,939. Patented Sept. 12, 1893.

Witnesses
Raymond L. Barnes.
W. H. Shipley.

Inventor
P. W. Reck
By P. T. Dodge
Attorney

UNITED STATES PATENT OFFICE.

PETER WM. RECK, OF DAVENPORT, IOWA.

CHUCK.

SPECIFICATION forming part of Letters Patent No. 504,939, dated September 12, 1893.

Application filed September 16, 1892. Serial No. 446,041. (No model.)

*To all whom it may concern:*

Be it known that I, PETER WM. RECK, of Davenport, county of Scott, and State of Iowa, have invented a new and useful Improvement in Chucks, of which the following is a specification.

My invention relates to chucks and, more particularly, to those adapted to be applied to planers or other machines for holding the work while it is being operated upon.

The object of the invention is to provide a device of this character which will be susceptible of various adjustments to the end that it may be readily and quickly set to hold work in different positions and of various forms according to the requirements encountered in practice.

The invention consists of a chuck embodying two jaws, one of which is movable bodily toward and from the other and is so supported at its two ends that it is capable of adjusting itself automatically to an angular position relatively to the opposite jaw in order that it may clamp objects of tapered form.

It further consists in sustaining the jaws so that they may be turned bodily around the axis with the object operated on held between them and then fixed in the required position.

The invention also consists in the details of construction and combinations of parts hereinafter described and claimed.

Figure 1:
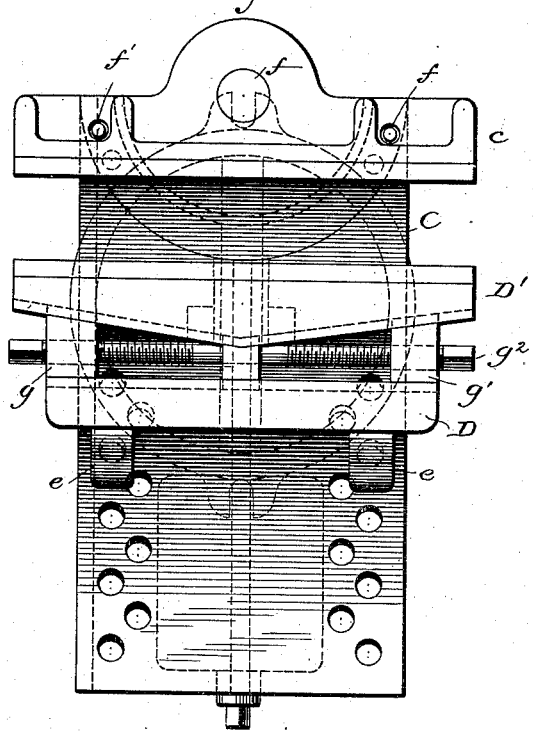
Figure 2:
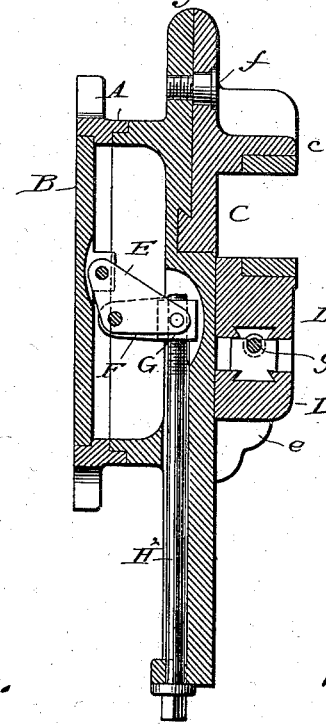

In the accompanying drawings,—Figure 1 is a front elevation of the chuck. Fig. 2 is a vertical longitudinal section through the same.

Referring to the drawings,—A represents an annular plate or ring, which is provided at opposite sides with ears by means of which it may be secured to the shaper, planer or other machine in connection with which the chuck is to be employed.

B represents a circular base-plate having its peripheral edge mounted in a circular recess formed in the rear face of the ring; and C represents a face plate or frame formed with a circular flange having its edge mounted to turn loosely on the front face of the ring A. The face plate is provided at its upper edge with a fixed forwardly-projecting jaw $c$, and is formed below this jaw to sustain a movable jaw D, in a manner more fully described hereinafter. The face-plate carrying the jaws and the circular plate B are so connected that they may be turned together bodily on the intermediate ring and secured in any required position. The connection consists of two triangular shaped links E, pivoted between their ends within two ears F, projecting rearwardly from the back of the face plate. At one end each of the links is pivoted to the circular base-plate while their opposite ends are pivoted to opposite sides of a vertically-moving nut G, which is located between the ears on the face plate. The nut is provided with a vertical threaded opening adapted to receive the threaded end of a vertical rod $H^2$, which is mounted in bearings in the face plate and is provided at its lower end with a head by means of which it may be turned. By turning the rod in the proper direction the nut will be caused to descend thus moving the upper ends of the links forward and drawing the circular plate, to which they are pivoted, forcibly against the ring A. By loosening the bolt the chuck may be turned bodily with the circular plate and afterward again secured in the desired position. The upper jaw $c$ is mounted on a pivot or stud $f$ projecting out from the face plate and is capable of being turned thereon to different positions. It is fixed in adjusted position by means of pins $f'$ stuck into holes provided therefor in the face plate, as shown in Fig. 1. On the back of this jaw is a curved rib $c'$, concentric with the pivot $f$, which rib fits into a corresponding groove or way in the face plate, the purpose being to relieve the pivot of strain when pressure is applied to the jaw. The rib and groove are dovetailed, as shown in Fig. 2, so that when pressure is applied to the jaw the latter will be drawn and held tightly against the face plate. The opposite jaw is made in two parts D, D'. The part D, which may be termed the base or support of the jaw, is supported on, or against, the face plate by brackets $e$ formed with downwardly or outwardly inclined dowels adapted to enter correspondingly inclined sockets in the face plate. By shifting the brackets the jaw D, D' may be supported in different positions to vary the distance between the fixed and movable jaws. The section D' of the movable jaw is tapered from the longitudinal center outward on the rear side, and between the two sections are arranged two wedge-shaped sliding blocks $g$, $g'$ dovetailed into longitudinal grooves in both sections, as clearly shown in Fig. 2, to hold the parts together. These blocks are screw-threaded, one having a right-hand, and the other a left hand, thread, and they are connected by a right and left hand screw $g^2$ by which they are drawn together or forced apart to advance or retract the section D'.

The movable jaw having first been properly adjusted by retracting the section D', and locating the brackets $e$ to sustain the section D in proper position, the article to be clamped is placed between the jaws and the screw $g^2$ turned in the direction to draw the blocks $g$, $g'$ toward each other and advance the section D', until the article is clamped with sufficient force. The screw is movable longitudinally with the blocks, and it will therefore be understood that when the screw is turned to draw the blocks toward each other, either block may remain at rest while the other is moving inward, the screw in such case traveling longitudinally through the stationary block, or the two blocks may move toward each other simultaneously. As soon as either end of the movable section D strikes the article to be clamped, that end, and consequently the block which moves it, are arrested, after which the opposite block alone moves forward to advance its end of the jaw until the article is firmly clamped. Thus it will be seen that the chuck will automatically adjust itself to articles of tapering or irregular form, and that no special adjustment is required unless the taper of the article exceeds the limit of angular adjustability of the section D, in which case either the jaw $c$ may be turned and fixed in the required angular position, or the brackets $e$ may be adjusted to hold the jaw D D' in an inclined position relatively to the fixed jaw

Having thus described my invention, what I claim is—

1. In a chuck the combination with the face plate, of a fixed or stationary jaw thereon, a movable jaw made in two sections one of which is sustained on the face plate, wedges between said sections to force the same apart, and a screw for adjusting said wedges.

2. In a chuck the combination with the face plate, of a jaw pivoted thereon and adapted to be set in different angular positions, a movable-jaw made in two sections one of which is sustained on the face plate, wedges between said sections to force the same apart, and a screw for adjusting said wedges.

3. In a chuck the combination with the face plate, of a jaw supported thereon immovably, a movable jaw made in two sections one of which is sustained on the face plate, movable wedges between said sections to force the same apart, and a right and left hand screw threaded through said wedges to adjust the same.

4. In a chuck the combination with the face plate, of a jaw immovably supported thereon, a movable jaw made in two sections, one of which is sustained on the face plate, the other section tapering on the rear side from the longitudinal center toward both ends, wedges between the ends of said sections to force the same apart, and a right and left hand screw threaded through said wedges to adjust the same.

5. In a chuck the combination of the face plate, the jaw $c$ sustained thereon, the movable jaw made in two sections D, D', the movable brackets $e$ $e$ for sustaining the movable jaw, the wedges between the two sections of the movable jaw, and the screw $g^2$ threaded through said wedges.

6. In combination with the base plate, the face plate provided with clamping jaws, the intermediate ring adapted to be secured to the machine, the triangular links pivoted between their ends to the face plate and having one of their ends pivoted to the base plate, the nut pivoted between the other ends of the links and the threaded rods sustained by the face plate and adapted to enter the nut.

In testimony whereof I hereunto set my hand, this 18th day of August, 1892, in the presence of two attesting witnesses.

PETER WM. RECK.

Witnesses:
JOHN B. MICLOT,
HENRY J. GERWE.